United States Patent [19]

Rosenblum

[11] Patent Number: 5,495,134
[45] Date of Patent: Feb. 27, 1996

[54] DYNAMOELECTRIC BRUSH HOLDER

[75] Inventor: Neal B. Rosenblum, Kettering, Ohio

[73] Assignee: ITT Automotive Electrical Systems Inc., Auburn Hills, Mich.

[21] Appl. No.: 123,962

[22] Filed: Sep. 20, 1993

[51] Int. Cl.⁶ .......................... H02K 13/00; H02K 15/14
[52] U.S. Cl. .......................... 310/239; 310/235; 310/242
[58] Field of Search .................... 310/235, 238, 310/239, 240, 241, 242, 245, 247

[56] References Cited

U.S. PATENT DOCUMENTS

| | | | |
|---|---|---|---|
| 4,293,789 | 10/1981 | King | 310/239 |
| 4,423,549 | 1/1984 | King | 29/597 |
| 4,596,941 | 6/1986 | Kluck | 310/239 |
| 4,663,552 | 5/1987 | Ohmstedt | 310/246 |
| 4,694,214 | 9/1987 | Stewart, Sr. | 310/239 |
| 4,774,754 | 10/1988 | Stewart, Sr. | 29/596 |
| 4,916,347 | 4/1990 | Pillerel | 310/239 |
| 5,004,943 | 4/1991 | Gagneux | 310/234 |
| 5,006,747 | 4/1991 | Stewart, Sr. | 310/239 |
| 5,047,679 | 9/1991 | Baader et al. | 310/89 |
| 5,113,104 | 5/1992 | Blaettner et al. | 310/90 |
| 5,172,465 | 12/1992 | Stewart, Sr. | 29/597 |

FOREIGN PATENT DOCUMENTS

| | | | |
|---|---|---|---|
| 0139451 | 9/1984 | European Pat. Off. . | |
| 0257407 | 8/1987 | European Pat. Off. . | |
| 0282377 | 2/1988 | European Pat. Off. . | |
| 384223 | 6/1990 | Germany | 310/242 |
| 2094561 | 9/1982 | United Kingdom | 310/242 |

OTHER PUBLICATIONS

International Search Report for Appln PCT/US94/10069 filed Sep. 9, 1994.

*Primary Examiner*—Steven L. Stephan
*Assistant Examiner*—D. R. Haszko
*Attorney, Agent, or Firm*—Dykema Gossett

[57] ABSTRACT

A brush holder body for a dynamoelectric machine comprising a molded body, integrated cantilever fingers molded into the body, the cantilever fingers extending radially inward from distal portions of the body, the cantilever fingers having a normal position into which they are molded extending at an angle to a plane of a commutator clearance opening the angle having a direction extending away from a motor armature position, wherein the cantilever finger is flexible and upon receipt of a force, flex in the direction of the armature, wherein the brush holder also comprises a snap feature for retaining the cantilever finger in a second position in which the cantilever finger prevents movement of a brush into the commutator clearance opening, wherein in the normal position, the cantilever finger allows movement of the brush into the commutator clearance opening and the cantilever finger does not contact a commutator of the dynamoelectric machine.

10 Claims, 6 Drawing Sheets

DYNAMOELECTRIC BRUSH HOLDER

This invention relates to dynamoelectric machines and, more particularly, to an apparatus and method for securing brushes in a direct current machine during assembly.

BACKGROUND OF THE INVENTION

A typical dynamoelectric machine armature is assembled to an end cap or end frame at either end of the dynamoelectric machine. The end cap or end frame carries spring biased brushes that, in use, engage a commutator of the armature. One difficulty encountered in the assembly of the dynamoelectric machine is maintaining the brushes in a retracted position out of the way of the commutator of the armature as the armature shaft is inserted into a bearing in the end frame.

One known method for securing the brushes is illustrated in FIGS. 1 and 2. The brush holder body 16 holds the brush 14 and a biasing spring 12 during assembly using a finger 18, having an extension 22 and contact surface 20 contacting the brush 14. The contact surface 20 on extension 22 prevents spring 12 from forcing brush 14 out of the brush holder body 16 into the region where the commutator is to occupy.

During assembly, the motor commutator 26 comes in contact with the extension 22 of cantilever finger 18, pushing the finger 18 away from brush 14 so that contact surface 20 no longer retains brush 14 retracted. When this occurs, spring 12 is enabled to force brush 14 against commutator 26, which is the desired assembled position. During operation of the dynamoelectric machine, the fingers rub on the underside of the commutator 26 causing armature drag and the possibility of debris due to material wear and finger breakage. Additionally, noise may result from the finger 18 rubbing against the rotating commutator 26. The fingers 18 may be snapped or broken off as a result of this rubbing.

SUMMARY OF THE PRESENT INVENTION

Advantageously, this invention provides a brush holder for a DC motor having integrated fingers for retaining the motor brushes in a retracted position during assembly and movable from the retracted position during assembly of the motor armature. Advantageously, this invention provides a brush holder with an integrated finger for retaining the brush during assembly, which finger does not rub upon the motor commutator or any other part of the rotating motor portion after motor assembly.

Advantageously, according to this invention, a brush holder for a DC motor has integrally constructed a cantilever finger having a first normal position at which first position the finger normally rests when forces are not applied to the finger. When in said first position and the motor is assembled, the finger does not contact the motor commutator.

Advantageously, according to this invention, when the brush is assembled in the brush holder, the finger is bent from its normal position to a position where it contacts an axially facing surface of the brush, thereby retaining the brush in a retracted position so that the brush does not interfere with assembly of the motor. A means is provided for maintaining the finger in the second position. During assembly of the motor, the commutator comes in contact with the finger, releasing the finger from the means for retaining it in the second position and allowing the finger to move back to its normal first position. As the finger moves back to its normal first position, the brush is allowed to extend and to contact the motor commutator wherein after assembly, the finger does not rub against the motor commutator or any other part of the motor.

Advantageously, the method of this invention comprises the steps of (a) fabricating a brush holder, having a body and at least one finger extending therefrom, wherein the finger has a normal position where it does not interfere with a commutator region of the motor, (b) placing a brush in a brush holder, (c) deflecting the finger from the normal position to a retained position where at least a portion of the finger interferes with a commutator region, in which position, the finger retains the brush in a retracted position out of interference with the commutator region, (d) assembling the commutator through the brush holder, wherein the commutator contacts the finger portion interfering with the commutator region, releasing the finger from the retained position, wherein the finger snaps back to the normal position out of interference with the commutator, thereby preventing drag, noise and wear of the finger on the commutator.

A more detailed description of this invention is set forth below.

DETAILED DESCRIPTION OF THE INVENTION

Figure 1:
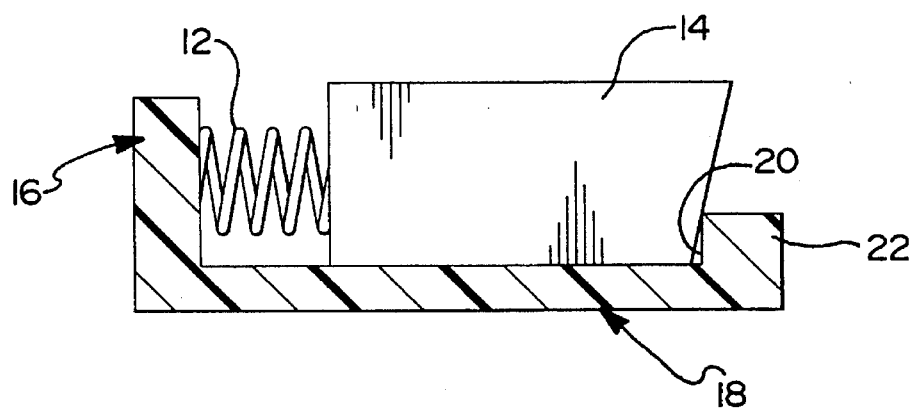
FIGS. 1 and 2 illustrate a prior art DC motor brush holder and assembly technique.
Figure 2:
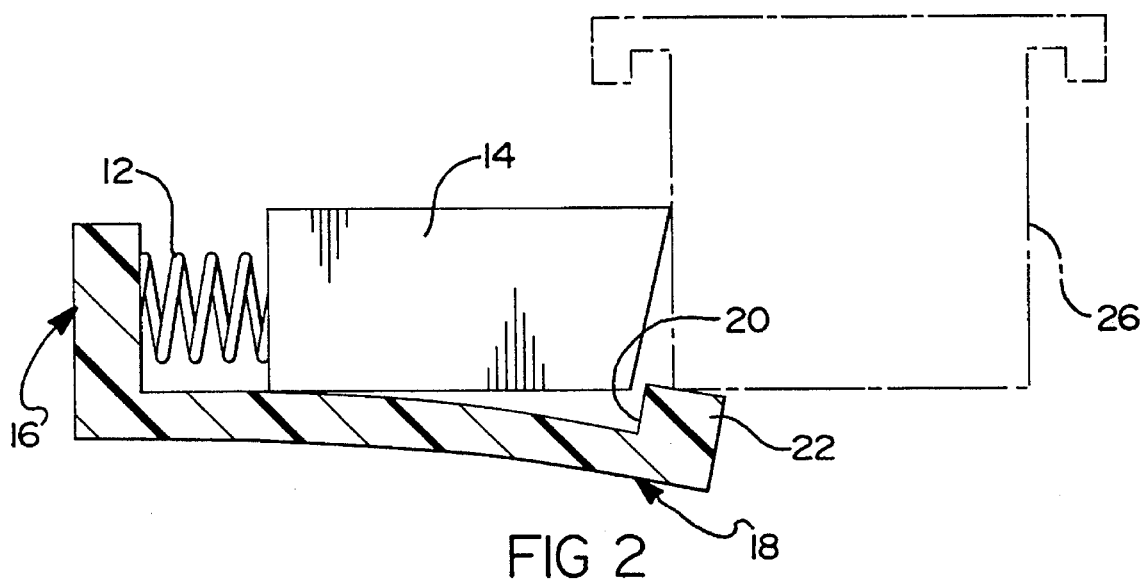
Figure 3:
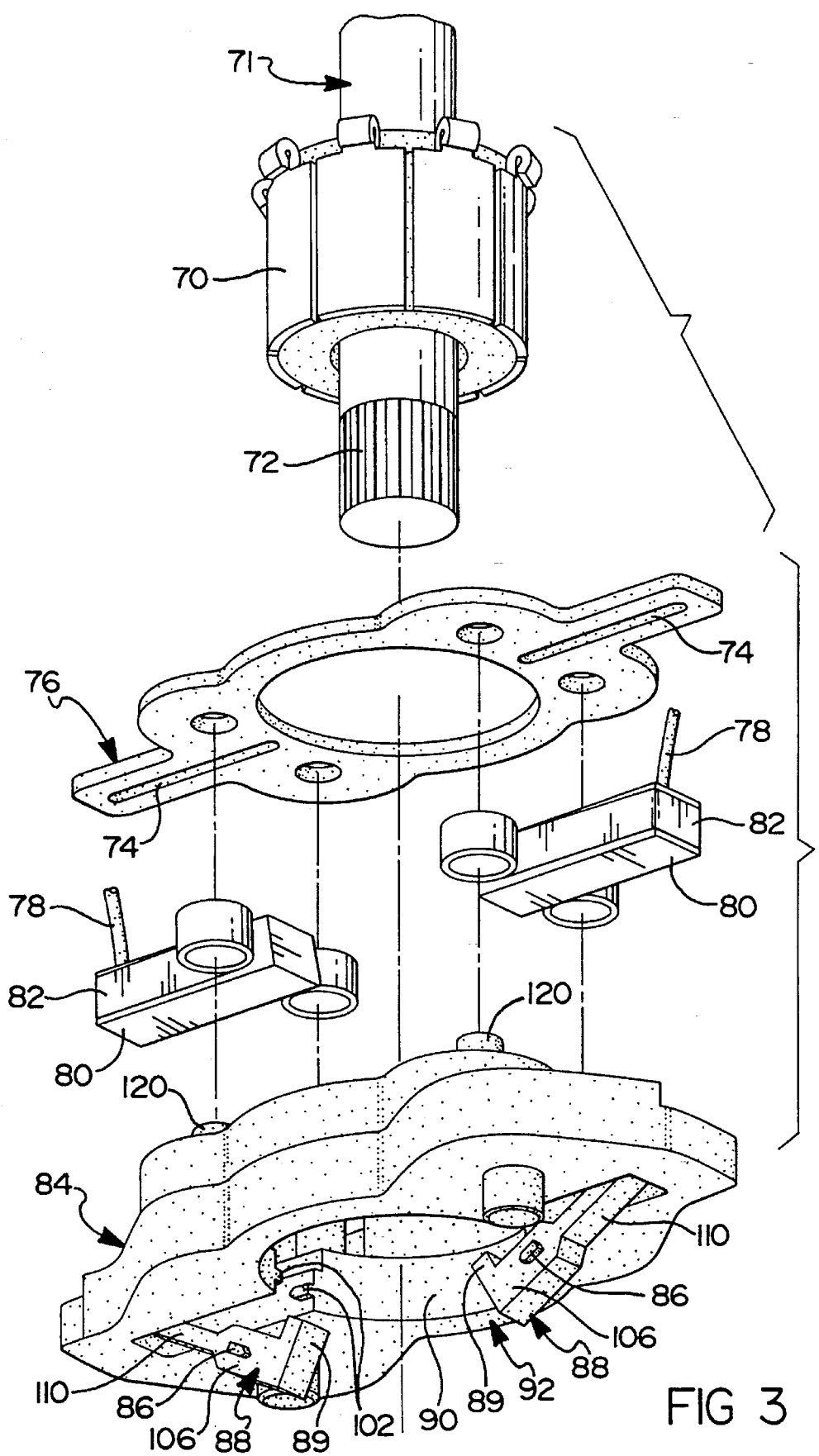
FIG. 3 illustrates an exploded view of a DC brush holder according to this invention, brushes, springs and a commutator.

Referring to FIG. 3, the method and apparatus of this invention are directed to assembling the DC motor shaft 72 and commutator 70 to the brush holder 84. Brush holder 84 retains the motor brushes 80 and negator springs 82 within brush holder 84, between brush holder 84 and brush holder cap 76. Brushes 80 each include a shunt or conductive portion 78 which, when assembled, protrudes through shunt slot 74 of brush holder cap 76.

Figure 4:
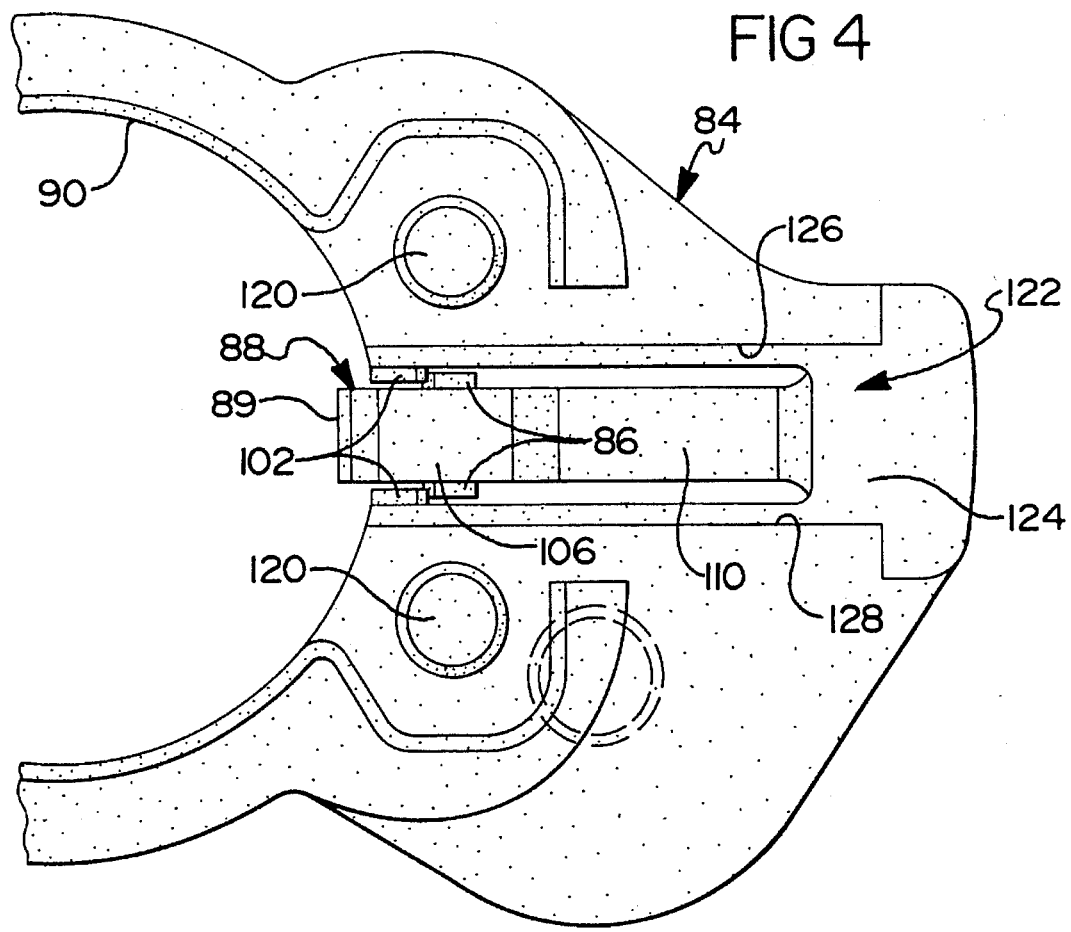
FIGS. 4 and 5 illustrate views of the brush holder according to this invention.
Figure 5:
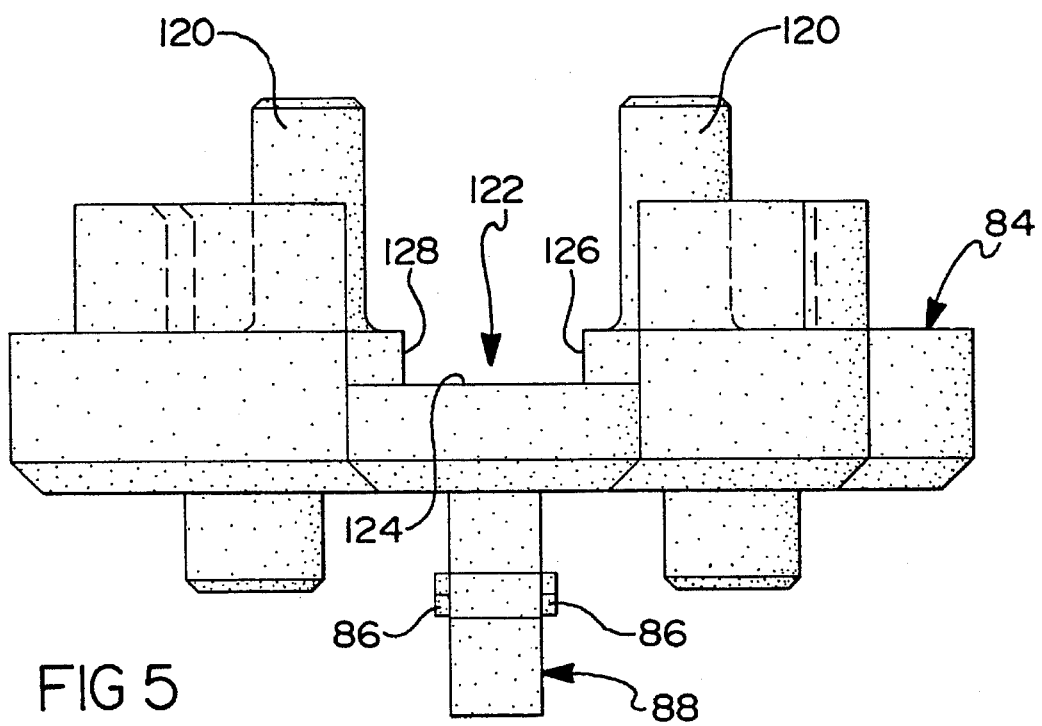

Referring now also to FIGS. 4 and 5, brush holder 84 includes posts 120 to which negator springs 82 are mounted. Brushes 80 are retained in slots 122 and are slidably engaged with the sliding surfaces 124 retained in the slots 122 by sidewalls 126 and 128. When assembled, the spring 82 will tend to force the brushes 80 toward the commutator clearance hole 90. The housing is adapted to receive a shaft and commutator from a first direction.

Brush holder 84 has integrally molded therein two cantilever fingers 88 each having an extending portion 89 for retaining the brushes in place during assembly, as explained below, and two snap features 86 (only one shown) for maintaining the cantilever fingers 88 in a second position, also explained below.

As shown in FIGS. 3, 4 and 5, the cantilever fingers 88 are in their normal position where they rest when no force is applied thereon. Each cantilever finger 88 in its normal position, does not interfere with a commutator region which occupies most of the space of the commutator clearance hole 90 where the commutator will rest when the parts are assembled.

The cantilever fingers 88 extend radially inward from distal portions of the body of brush holder 84. As shown, the cantilever fingers 88 are molded so that, when each is in the first or normal position, it extends away from the position of motor armature 71 (FIG. 3) at a predetermined angle to a plane of the commutator clearance opening 90. The predetermined angle is in a direction away from the side of the brush holder adapted to receive the commutator shaft 72.

The cantilever finger is flexible and, upon receipt of a force, flexes in the direction of the position of motor armature 71. The brush holder snap feature 86 comprises means for retaining the cantilever finger in the second position, deflected in the direction of the armature position so that it is substantially co-planar with opening 90. In the second position, cantilever finger 88 operatively prevents movement of brush 80 into the commutator clearance opening.

Figure 6:
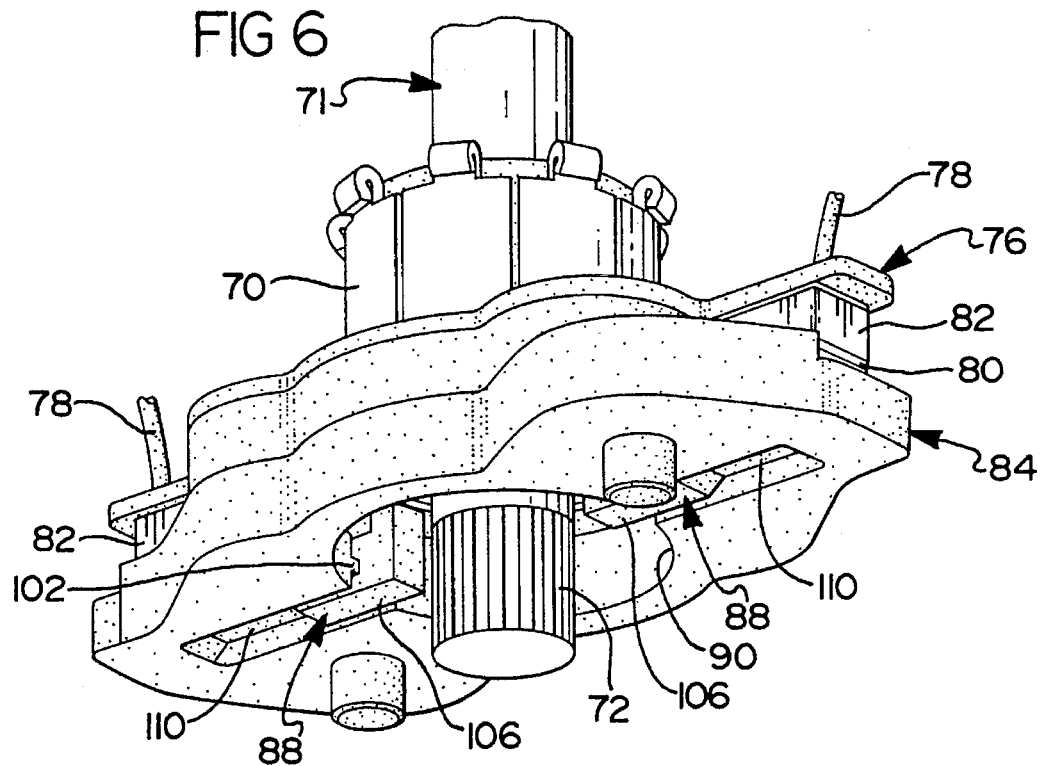
FIG. 6 illustrates a view of the commutator and brush holder partially assembled, before the cantilever fingers have released from the position of holding the brushes.
Figure 7:
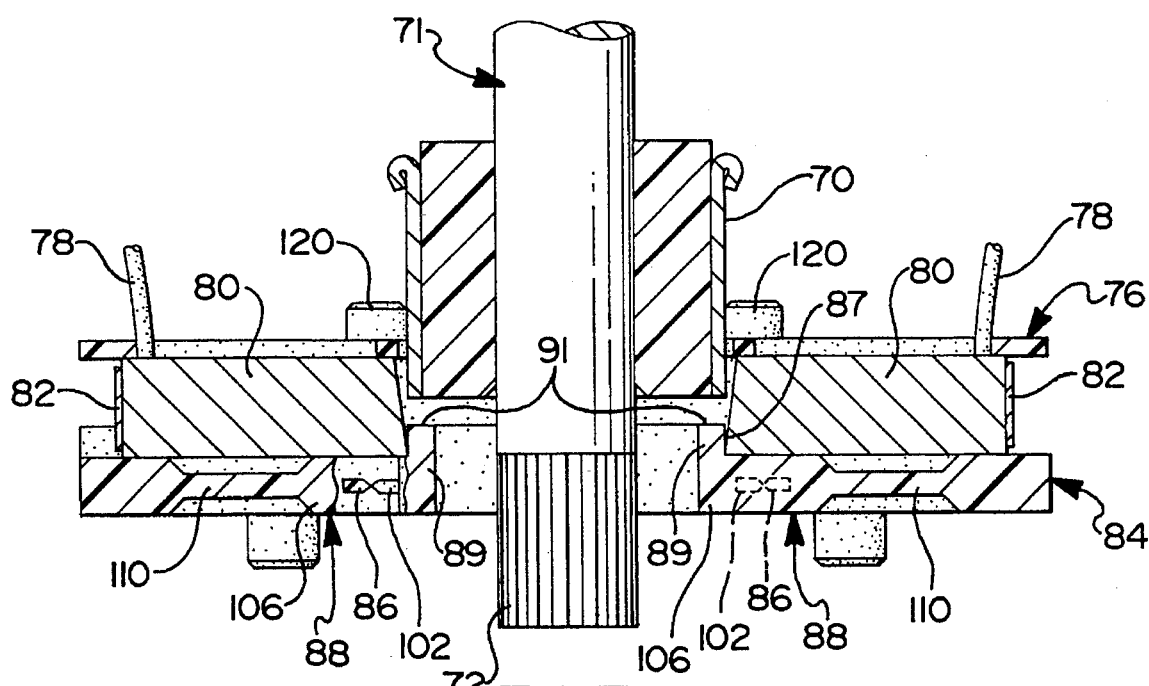
FIG. 7 is a cross-section of FIG. 6, illustrating the cantilever fingers retaining the brushes in position.

Referring now also to FIGS. 6 and 7, during assembly, the brushes 80 of a known type and negator springs 82, also of a known type, are assembled into brush holder 84 as indicated above. When the brushes 80 are assembled into brush holder 84, the springs 82 tend to force brushes 80 into the commutator region and would cause the brushes to interfere with assembly of the commutator through the brush holder if the brushes are not retained in a retracted position. Before brushes 80 and negator springs 82 are placed in brush holder 84, the cantilever fingers 88 are deflected from their normal at rest position to the position shown in FIGS. 6 and 7 and retained in this position by the snap feature illustrated in more detail below. When retained in the second position, the brushes 80 are prevented from extended into the commutator region by surface 87 and extending portion 89 of cantilever 88. In this position, part of extending portion 89 of cantilever 88 interferes with the commutator region of the motor.

FIGS. 6 and 7 illustrate the commutator and shaft partially assembled into the brush holder but not completely in place.

Figure 8:
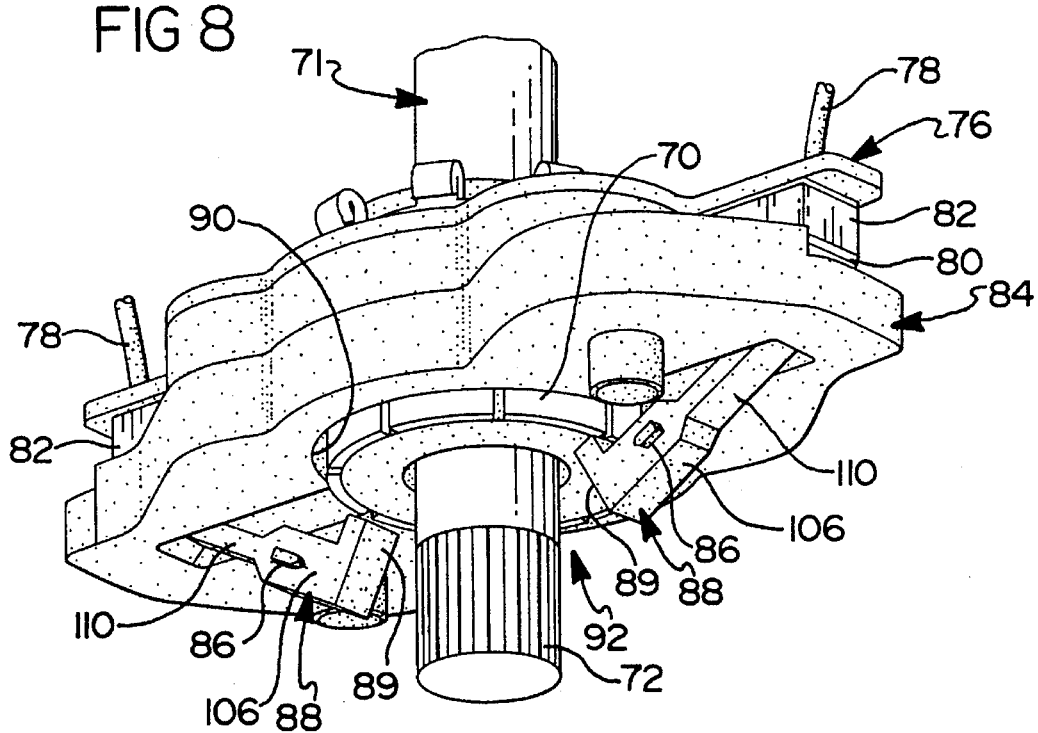
FIG. 8 illustrates the assembled brush holder and commutator according to this invention.
Figure 9:
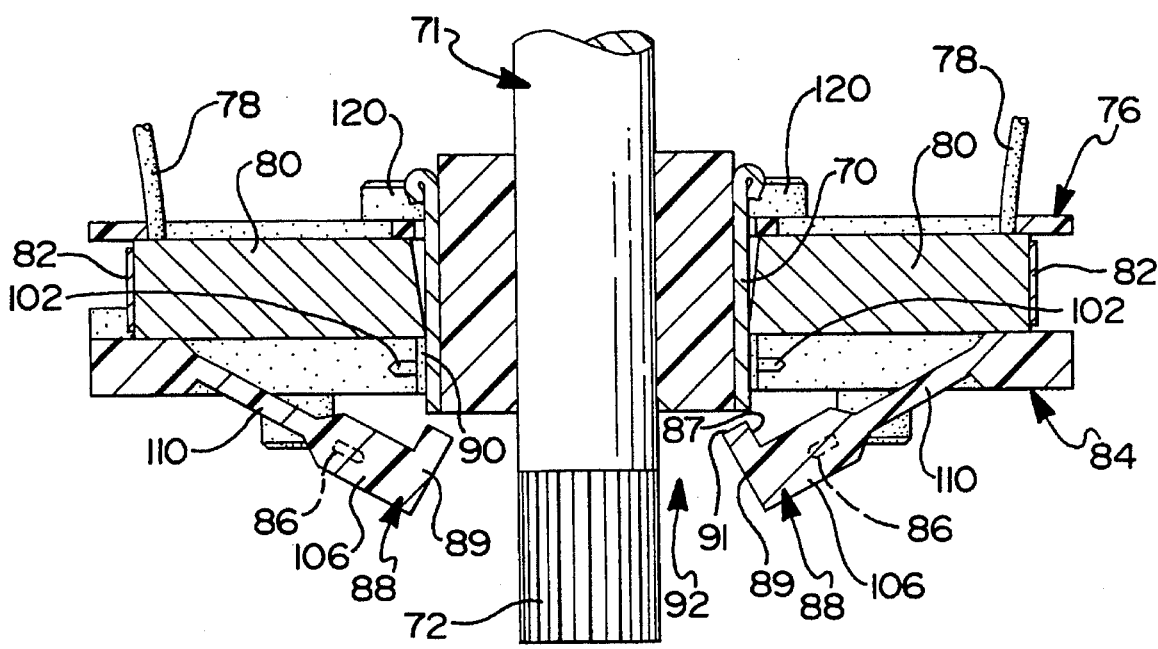
FIG. 9 illustrates a cross-section of FIG. 8.

FIGS. 8 and 9 illustrate the commutator 70 and shaft 72 fully assembled within the motor brush holder 84. As the commutator 70 and shaft 72 are pushed into place, the commutator 70 contacts surface 91 of the extending portions 89 of the cantilever fingers 88 and applies force against the cantilever fingers 88, releasing the snap means holding the cantilever fingers 88 in place and allowing cantilever fingers 88 to spring or deflect back to their normal positions (FIGS. 3 and 4). When cantilever fingers spring back, the brushes 80 are released and are forcibly extended against the commutator 70 by springs 82. This is the normal operating position of brushes 80 during operation of the dynamoelectric machine.

The region occupied by the commutator 70 and shaft 72, which region is designated by reference 92, defines the commutator region. The cantilever fingers 88 interfere with the commutator region 92 when in the second position and clear the commutator region 92 when in the normal first position. The interference of fingers 88 and commutator region 92 provides for automatic release of brushes 80 during assembly of the motor as the commutator contacts fingers 88, forcing them out of the second position so that they spring back to their normal positions. After the motor assembly is completed, cantilever fingers 88 do not contact commutator 70 during operation of the motor and do not contact any other moving portion of the motor and therefore do not create a possible hinderance of the operation of the motor. Removal of Fingers 88 by snapping or braking off the fingers 88 is not necessary.

Figure 10:
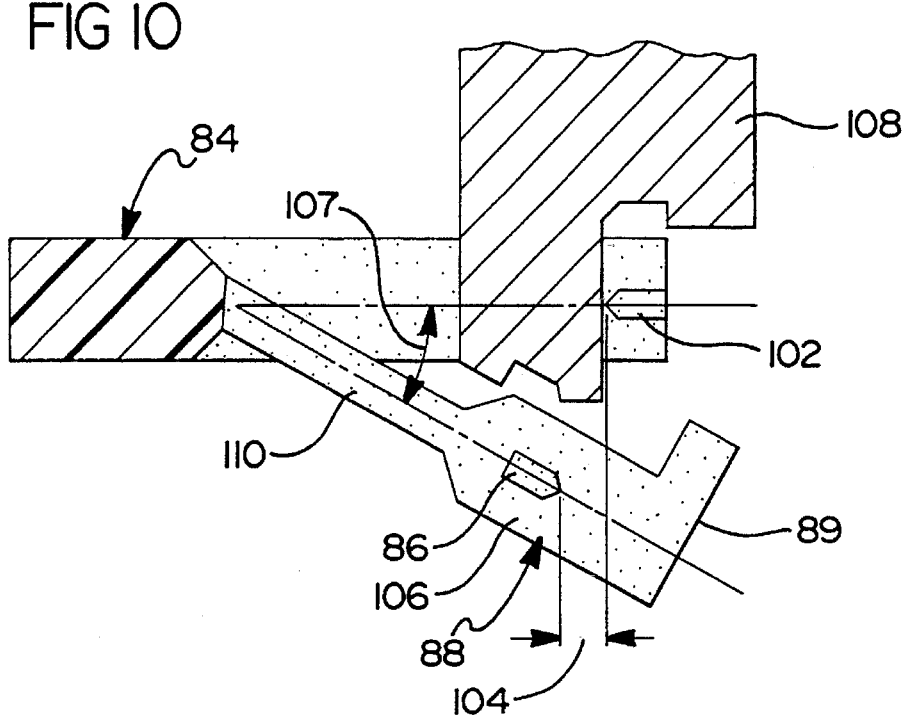
FIG. 10 illustrates a view of a cantilever finger and a portion of the brush holder according to this invention, including a snap feature, and a portion of a mold for molding the brush holder.
Figure 11:
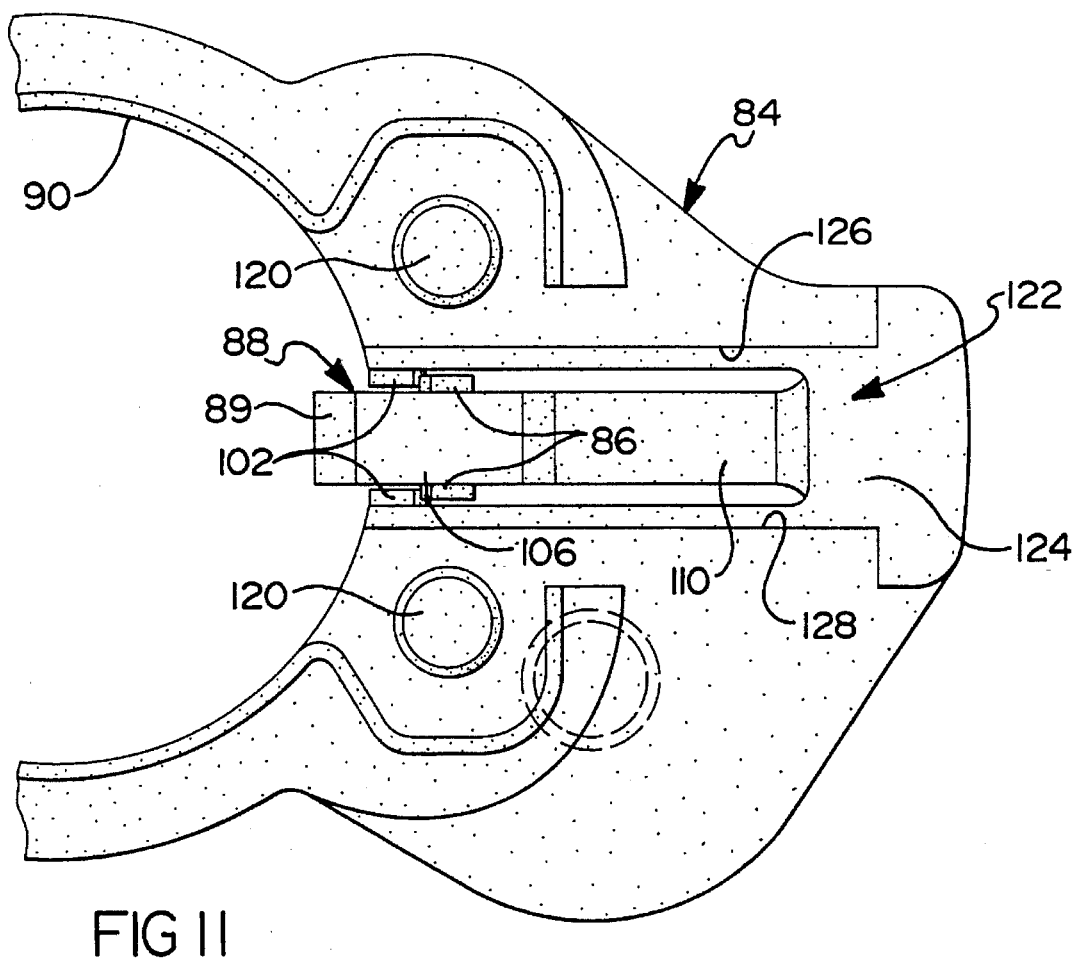
FIG. 11 illustrates a view of the brush holder and snap feature according to this invention.

Referring now to FIG. 10, a cross-section of brush holder 84 is shown, including a view of cantilever 88, its snap feature 86 and snap feature 102 on the brush holder body. Referring now also to FIG. 11, it can be seen that two snap features 86 are provided on either side of cantilever 88 and two corresponding snap features 102 are provided on the body of brush holder 84.

To simplify manufacturing costs, a single draw plastic mold may be used to mold the brush holder 84. A portion of the mold 108 is shown. Note that a side-pull in the mold is often needed for the undercut of a snap feature on an injection molded plastic part such as brush holder 84. In order to allow the snap features 86, 102 to be molded with a single draw mold and eliminate the necessity of the side pull, this invention places the normal position of the cantilever 88 at an angle 107 large enough so that the distance 104 between the two snap features 86 and 102 allows for clearance of the mold 108, as shown. The angle 106 necessary to allow a single pull mold will vary from implementation to implementation and can be easily determined by one skilled in the art in view of the information herein.

The cantilever 88 is shown with a thin portion 110 and a thick portion 106 (thicker than the thin portion 110) towards its extending end. The amount of force required to deflect the cantilever 88 from its normal position shown to its second position in which it is snapped, can be easily controlled by varying the respective lengths of the narrow or thin portion 110 and thick portion 106 of the cantilever finger. Extending the narrow portion and shortening the thick body portion provides for more flexibility and less force required to move the cantilever finger 88 from the normal at rest position to the second position.

FIG. 11 illustrates the cantilever fingers 88 retained in the second position by snap feature 86, 102.

While in the above figures, the commutator 70 and shaft 82 are not shown with a motor armature mounted thereon, those skilled in the art can easily assemble a motor armature to shaft 72 and couple the armature windings to commutator 70 before assembly of the commutator 70 and shaft 72 through brush holder 84, if so desired. The remainder of the assembly of the DC motor is easily achieved by one skilled in the art in a known manner and need not be set forth in more detail herein.

Various other improvements and modifications to this invention may occur to those skilled in the art and such improvements and modifications will fall within the scope of this invention as set forth below.

The embodiments of the invention in which an exclusive property or privilege is claimed are defined as follows:

1. An apparatus comprising:

a motor commutator;

a brush holder having an integrally constructed cantilever finger having a first normal position at which first position the finger normally rests when forces are not applied to the finger and does not contact the motor commutator, wherein the finger is deflectable into a second position;

at least one brush mounted within the brush holder;

a spring biasing the brush towards the motor commutator;

means for retaining the finger in the second position before the commutator is assembled to the brush holder, wherein the finger contacts an axially facing surface of the brush thereby retaining the brush in a retracted position so that the brush does not interfere with assembly of the commutator to the brush holder;

means for releasing the finger from the second position when the commutator is assembled to the brush holder, allowing the finger to move back to its normal first position and allowing the brush to extend and to contact the motor commutator, wherein, after assembly, the finger does not rub against the motor commutator.

2. The apparatus of claim 1, wherein said finger includes a portion extending into said commutator region for contacting the axially facing surface of said brush.

3. The apparatus of claim 2, wherein said releasing means includes a surface formed on said portion of said finger extending into said commutator region.

4. A brush holder for a dynamoelectric machine, comprising:

a molded body portion having a centrally disposed commutator clearance opening extending therethrough;

a cantilever finger molded in said body, said finger extending radially inwardly from distal portions of said body portion, said finger having a first position into which said finger is molded extending at a predetermined angle to a plane of said opening such that said finger is biased toward said first position when moved away from said first position, and wherein said cantilever finger in said first position allows movement of a brush into said opening, said finger not interfering with said opening in said first position;

said finger being movable to a second position away from said first position in which said finger is substantially co-planar with said plane of said opening, said cantilever finger including means for preventing movement of the brush into said opening when in said second position; and, means for retaining said finger in said second position;

wherein said movement preventing means includes a portion of said finger extending into said commutator clearance opening when in said second position and having a first surface for contacting an axially facing surface of the brush to thereby retain the brush in a retracted position out of said opening when in said second position.

5. A brush holder for a dynamoelectric machine, comprising:

a molded body portion having a centrally disposed commutator clearance opening extending therethrough;

a cantilever finger molded in said body, said finger extending radially inwardly from distal portions of said body portion, said finger having a first position into which said finger is molded extending at a predetermined angle to a plane of said opening such that said finger is biased toward said first position when moved away from said first position, and wherein said cantilever finger in said first position allows movement of a brush into said opening, said finger in said first position not interfering with said opening;

said finger being movable to a second position away from said first position in which said finger is substantially co-planar with said opening and in which said cantilever finger prevents movement of the brush into said opening; and, means disposed on said finger and said body portion for retaining said finger in said second position.

6. The brush holder of claim 5, wherein said retaining means includes a first snap feature on said finger and a second snap feature formed on said body portion, said first snap feature and said second snap feature interfering with each other at said second position, said interference preventing said finger from returning to said first position.

7. The brush holder of claim 6 wherein said cantilever finger is flexibly molded to said body portion, said finger flexing from said first position to said second position upon receipt of a force sufficient to overcome said bias and said interference.

8. The brush holder of claim 6 wherein said predetermined angle is selected such that said first snap feature is separated from said second snap feature by a clearance distance to thereby permit use of a single draw mold to form said brush holder whereby manufacturing costs are reduced.

9. The brush holder of claim 4 further comprising:

means for releasing said finger from said second position when a motor commutator is assembled into said brush holder to thereby allow said finger to move back to said first position and to allow the brush to extend and to contact the motor commutator.

10. The brush holder of claim 9 wherein said releasing means comprises a second surface of said finger formed on said portion of said finger extending into said commutator clearance opening for being engaged by the motor commutator.

\* \* \* \* \*